3,267,155
ORTHO-ALKYLATION PROCESS
Gerd Leston, Pittsburgh, Pa., assignor to Koppers
Company, Inc., a corporation of Delaware
No Drawing. Filed Aug. 13, 1963, Ser. No. 301,915
7 Claims. (Cl. 260—619)

This invention relates to the alkylation of hydroxyaromatic hydrocarbons. In one specific aspect, it relates to the selective alkylation of hydroxyaromatic hydrocarbons, particularly phenols, in a ring position ortho- to the hydroxyl group.

Conventional methods of alkylation, such as Friedel-Crafts alkylation, result in a more or less random introduction of alkyl groups onto the ring of aromatic hydrocarbons, with any preferential alkylation resulting from the steric configuration of the particular hydroxyaromatic hydrocarbon being alkylated. Friedel-Crafts alkylation involves reacting an aromatic hydrocarbon with a halogenated aliphatic hydrocarbon in the presence of e.g., aluminum chloride. In addition to providing a non-specific distribution of the various alkylated isomers, the Friedel-Crafts alkylation process suffers the additional disadvantage of the rearrangement of the carbon skeleton when branched chain hydrocarbons are introduced.

A great step forward in the alkylation art was made by George G. Ecke and Alfred J. Kolka, who found that certain metal aryloxides were efficient for the selective ortho-alkylation of phenolic bodies when used as described in U.S. Patent No. 2,821,898. In their patent Ecke et al. described the selective ortho-alkylation of phenols using the phenoxy derivatives of such elements as aluminum, magnesium, iron, zinc, phosphorus, arsenic, antimony, bismuth and tin.

The pioneer work of Ecke and Kolka created the illusion that a simple choice of a desired metal phenolate was the key to all of the problems of selective ortho-alkylation. Unfortunately, this hope has not been realized. The metal phenolates (or aryloxides) when used as alkylation catalysts, behave in the unpredictable manner typical of most catalyst systems. Of the phenoxy derivatives included in the Ecke et al. patent, only aluminum phenoxide is an excellent catalyst for ortho-alkylation. Magnesium phenoxide is good, and zinc phenoxide is acceptable. The phenoxides of the other metals specifically named by Ecke and Kolka show a mediocre to poor performance as selective ortho-alkylation catalysts.

The use of metal aryloxides as ortho-alkylation catalysts has engendered numerous problems that were unforeseen at the time of their introduction to the art. With respect to the performance of the catalyst, there has been an increasing demand for catalysts capable of providing higher and higher selectivity, as determined by the ratio of ortho- to para-isomers present in the final product. Aluminum phenoxide, which is regarded as an excellent ortho-alkylation catalyst, provides in many instances a product mixture having an o/p ratio of 15:1 to 40:1. Less effective phenoxides, such as zinc phenoxide, provide an o/p ratio of only 2:1 to 4:1.

Reaction time, of course, is an important commercial consideration. Many of the metal aryloxides named by Ecke et al. are so sluggish in their behavior that the required reaction time becomes prohibitive. Other important considerations include the stability of the catalyst, particularly to moisture, ease of catalyst recovery, and effectiveness of the catalyst on repeated recycle.

Prior attempts to find metal phenoxides useful for selective ortho-alkylation other than those named by Ecke and Kolka, have met with uniform lack of success. It was believed, based on experience with titanium phenoxide, that titanium salts were completely ineffective as alkylation catalysts. Titanium phenoxide, as shown in comparative Example III, after one-half hour provided only a 2.6 percent concentration of ortho-alpha-methylbenzylphenol in the reaction mixture when used for styrenation of phenol, a relatively simple alkylation. Even after three hours the concentration had only increased to 14.7 percent.

I have discovered that, unexpectedly, the catecholate of titanium is an outstanding selective ortho-alkylation catalyst, even surpassing aluminum phenoxide in many aspects of its performance. Surprisingly, titanium catecholate gives product mixtures having an o/p ratio generally in excess of 40:1, and in many cases, a yield of ortho-alkylated product higher than that obtainable using aluminum phenoxide.

It is, therefore, an object of the present invention to provide a new and economical selective ortho-alkylation process resulting in improved yields of the ortho-alkylated products.

In accordance with the invention, a hydroxyaromatic hydrocarbon containing at least one reactive hydrogen in a ring position ortho- to a hydroxyl group is reacted with an olefin at an elevated temperature and a pressure up to 3,000 p.s.i. in the presence of a catalytic amount of a titanium catecholate.

The hydroxyaromatic hydrocarbons useful in the invention include all of those conventionally subjected to the alkylation reactions of the heretofore-known art having at least one reactive hydrogen in a ring position ortho- to a hydroxyl group. The hydroxyaromatic hydrocarbons can be mono- or polynuclear and also mono- or polyhydroxy; most commonly they are the hydroxybenzenes, hydroxynaphthalenes, bis-phenols and their lower alkyl-, phenyl-, benzyl-, halo- and amino-substituted derivates. Useful starting materials thus include phenol, o-cresol, m-cresol, p-cresol, o-, m-, and p-chlorophenol, 2,5-dichlorophenol, thymol, m-ethylphenol, p-t-butylphenol, carvacrol, mono-bromocarvacrol, catechol, resorcinol, pyrogallol, alpha-naphthol, mono-chloro-beta-naphthol, o-phenylphenol, p-phenylphenol, alpha-anthrol, o-, m-, and p-aminophenol, guaiacol, anol, eugenol and isoeugenol.

The olefins useful for alkylation according to the invention also include all of those commonly known to the alkylation art; in particular mono- or polyolefins, cyclo-olefins, aryl-substituted olefins, and halo-substituted olefins. Conventional alkylating agents are those having up to 8–12 carbon atoms, although high molecular weight olefins up to those containing about 20 carbon atoms can be used. Useful olefins thus include ethylene, propylene, butylene, isobutylene, amylene, isoamylene, hexene, heptene, butadiene, isoprene, chloroprene, diisobutylene, heptadiene, octene, decene, dodecene, hexadecene, octadecene, eicosene, styrene, alpha-methylstyrene, 2-phenylpropene-1, 2-phenylbutene-1, as well as mixtures of olefins and the like.

The catalyst used in the invention is titanium catecholate. The catalyst is preferably made by reacting a titanium tetrahalide, such as titanium tetrachloride, titanium hydroxide, or a titanium alkoxide, such as titanium isopropoxide, or titanium n-butoxide, with at least a stoichiometric quantity of catechol.

The catalyst is ordinarily pre-formed, although it may be formed in situ if catechol is selected as the hydroxy aromatic compound being subjected to alkylation, or if a sufficient quantity of catechol is added to the reaction mixture prior to alkylation. To pre-form the catalyst a sufficient quantity of, for example, titanium tetrachloride and either a stoichiometric quantity or an excess of catechol, are heated together at an elevated temperature of, for example, 60–250° C. As I have noted hereabove, titanium alkoxides or titanium hydroxide can be used in place of the titanium tetrahalide to form the titanium catecholate.

The amount of catalyst used generally ranges between about 0.05 and 15 mole percent, based on the number of moles of the material to be alkylated. Although the preferred amount of catalyst varies to some extent with the degree of alkylation desired, if less than 0.05 mole percent catalyst is used alkylation is quite slow. For economic reasons no advantage is seen in using more than 15 mole percent catalyst, although no adverse effects are obtained thereby. I prefer to use between about 0.3 and 10 mole percent catalyst for ease of reaction and economical operation.

The alkylation reaction is exothermic. It proceeds smoothly at elevated temperatures as low as 50° C. up to the boiling point of the reaction mixture under the particular pressure applied. Most alkylation reactions can be run at temperatures between 50 and 400° C., preferably between 125 and 300° C.

The reaction is run at pressures ranging from atmospheric pressure up to about 3,000 p.s.i.g. For the simple alkylations, for example, the alkylation of phenol or cresol with isobutylene or styrene, the reaction proceeds well at atmospheric pressure and, from the standpoint of equipment costs, the use of atmospheric pressure is most desirable. The more difficult alkylations involving, for example, alkylation with ethylene, high positive pressures in the range of 1200 to 3000 p.s.i.g. are required. It is obviously advantageous for economic reasons to run the reaction at the lowest convenient pressure.

Alkylation is accomplished using up to 2.5 moles of olefin per mole of hydroxyaromatic hydrocarbon.

The desired product can be recovered from the reaction mixture by a number of different methods. The catalyst may be inactivated by neutralization with the required amount of base. The base may be added per se as an aqueous solution. If desired, filtration of the resultant solid or separation of an aqueous layer may be carried out but it is not necessary to do so. The catalyst may also be hydrolyzed by the addition of water, followed, if desired, by filtration or separation; or by aqueous acid, followed by separation of the layer.

The product can also be isolated by removing the reaction mixture from the catalyst by fractional distillation or by flash distillation followed by fractional distillation. After the removal of the desired product, the residual titanium catecholate can be recycled for further use. One of the advantages of titanium catecholate as a catalyst is that it shows little loss in activity upon repeated recycle.

Still another means of isolating the desired product is to add sufficient base to the reaction mixture to neutralize the catalyst and to convert the unhindered phenols contained in the product to their salts. This can be followed by extraction of the desired compound or compounds with organic, water-immiscible solvents or by steam distillation, followed by separation of the layers, extraction of the product or distillation.

The operation can be conducted batch-wise or continuously, as desired. Unreacted starting materials and catalyst may be recycled for use in a subsequent run.

The compounds made by the process of my invention have well established uses in the art, such as monomers for phenolic resins, detergent intermediates, germicides, polymerization inhibitors, antioxidants, and the like.

My invention is further illustrated by the following examples:

EXAMPLE I

Preparation of titanium catecholate

Titanium tetrachloride, 180 g. (0.95 mole), was added portionwise to a suspension of catechol, 220 g. (2.0 moles), in xylene with cooling. The mixture was refluxed for 20 hours. Nitrogen was bubbled through the refluxing suspension for six hours to remove the last traces of hydrochloric acid. The resulting suspension was cooled, and filtered. The xylene-damp material, 456 g., was stored in a vacuum desiccator.

EXAMPLE II

Styrenation of phenol

A mixture of phenol, 94 g. (1.0 mole), and titanium catecholate, 3 g., was heated to 170° C., and styrene, 93.6 g. (0.9 mole), was added dropwise over a 20 minute period. Reaction dropped from 170 to 150° C. during the addition of styrene. The reaction mixture was heated at 170–180° C. for three hours and sampled. The reaction mixture was neutralized with 1.0 g. of 50 percent sodium hydroxide solution and fractionally distilled at 20 mm. Hg. Five fractions were collected as follows: water, 0.1 g., B.P. to 85° C.; phenol, 25.7 g., B.P. 85–87° C.; unknown I, 1.0 g., B.P. 87–190° C.; o-(α-methylbenzyl)phenol, 106.7 g., B.P. 190–192° C.; and unknown II, 3.6 g., B.P. 170–190° C. Residue, hold-up and loss amounted to 53.3 g. The above figures correspond to a 74 percent ultimate yield of o-(α-methylbenzyl)phenol.

EXAMPLE III

Styrenation of phenol with titanium phenoxide

A mixture of 3.40 g. (10 mmoles) of tetrabutyl titanate, 100 g. of phenol and 10 ml. of xylene was distilled in a 15 in. glass helix-packed column at atmospheric pressure. There was collected 7.8 g. (9.4 ml.) boiling at 116–135° C. Of this, about 0.2 g. was water. After removal of the water, the rest was dried ($Na_2SO_4$) and analyzed by vapor phase chromatography. Duplicate determinations showed 38.8 and 39.5 percent butanol. This corresponds to a recovery of 2.96 g. (39 percent × 7.6 g.) or 100 percent of theory. To the distillation residue, which was heated to 150° C. with stirring, 100 g. of styrene was added dropwise over nine minutes. At the end of this time, the temperature had dropped to 129° C. and the first sample was withdrawn. Additional samples were taken one-half hour and one and one-half hours after completion of the addition, during which time, the temperature rose to 150° C. The reaction was stopped and the mixture was allowed to cool after 3 hours.

After treatment with solid sodium carbonate and dilution with benzene, the samples were analyzed by vapor phase chromatography with the following results:

| Sample | 1 | 2 | 3 | 4 |
|---|---|---|---|---|
| Reaction Time (Hrs.) (After Addition) | 0 | 0.5 | 1.5 | 3 |
| Compound | Area Percent | | | |
| Styrene | 53.7 | 51.0 | 45.0 | 34.9 |
| Phenol | 46.3 | 44.5 | 45.7 | 43.0 |
| Unknown I | 0 | 1.2 | 2.0 | 2.5 |
| o-(α-methylbenzyl)phenol | 0 | 2.6 | 6.5 | 14.7 |
| Unknown II | 0 | 0.7 | 0.8 | 3.8 |
| p-(α-methylbenzyl)phenol | 0 | 0 | 0 | 0.3 |
| 2,6-bis(α-methylbenzyl)phenol | 0 | 0 | 0 | 0.4 |
| 2,4-bis(α-methylbenzyl)phenol | 0 | 0 | 0 | 0.4 |

It is thus seen that titanium phenoxide is ineffective as an ortho-alkylation catalyst.

EXAMPLE IV

Styrenation of phenol

Styrene, 93.6 g. (0.9 mole), was added dropwise over a twenty minute period to a mixture of phenol, 94 g. (1.0 mole), and titanium catecholate, 3 g., at 170–150° C. The reaction mixture was heated at 170–180° C. for three hours, and flash distilled at 10 mm. Hg pressure using an oil bath at 235° C. The distillate weighed 144.5 g. and the catalyst-containing residue, 43.6 g.

The above procedure was repeated using the catalyst residue, 43.6 g., phenol, 94 g. (1.0 mole), styrene, 93.6 g. (0.9 mole). Flash distillation of the reaction mixture at 10 mm. Hg pressure/235° C. bath temperature gave 153.5 g. of distillate and 34.4 g. weight gain in the catalyst residue.

The above procedure was repeated using the catalyst residue from the previous cycle, phenol 94 g. (1.0 mole), styrene, 93.6 g. (0.9 mole). Flash distillation of the reaction mixture at 10 mm. Hg pressure/237° C. bath temperature gave 158.0 g. of distillate and a net weight gain of 29.5 g. in the catalyst residue. The flash distillates from the three cycles were combined and fractionated at 20 mm. Hg. The residue from this fractionation was combined with the catalyst residue and the fractionation was continued. The distillation yielded 8.4 g. of styrene and phenol, B.P. 45–83° C.; 89.5 g. of phenol, B.P. 83–86° C.; intermediate, 2.7 g., B.P. 86–180° C., and o-(α-methylbenzyl)phenol, 216.2 g., B.P. 184–188° C. On further distillation, even at 146–156° C. and 1–2 mm., dealkylation took place. The above results correspond to an ultimate yield of 78 percent.

EXAMPLE V

Styrenation of m-cresol

A mixture of m-cresol, 108 g. (1.0 mole), and titanium catecholate, 3 g., was heated to 175° C., and styrene, 93.6 g. (0.9 mole), was added over a 20 minute period at 165–175° C. The mixture was heated at 170–180° C. for three hours and sampled. Gas chromatographic analysis of the sample showed 16.2 percent m-cresol, 1.0 percent unknown I, 76.6 percent 2-(α-methylbenzyl)-5-methylphenol, 1.0 percent unknown II, and 5.2 percent unknown III. The reaction mixture was neutralized with 1.7 g. of 50 percent sodium hydroxide solution and fractionally distilled at 20 mm. Hg. This yielded water, 0.5 g., B.P. to 98° C.; m-cresol, 27.7 g., B.P. 98–102° C.; intermediate I, 3.0 g., B.P. 102–193° C.; 2-(α-methylbenzyl)-5-cresol, 123.5 g., B.P. 193–198° C.; and intermediate II, 6.2 g., B.P. to 200° C./2 mm. Residue, hold-up and loss amounted to 43.7 g. The distillation results correspond to a 78 percent ultimate yield of 2-(α-methylbenzyl)-5-methylphenol.

EXAMPLE VI t-Butylation of phenol

Titanium catecholate, prepared as described in Example I, 100 g. was added to dried phenol, 1007 g. (10.7 moles), and the suspension was distilled to remove xylene (30 ml.). The mixture was charged into a one-gallon autoclave and heated to 170° C. The autoclave was vented and isobutylene was added under pressure (100 p.s.i.g.). Approximately 377 g. (6.7 moles) of isobutylene was absorbed over a four hour period. The mixture was heated at 170° C. for an additional 1.5 hours, cooled, and discharged. The discharged material was flash distilled at 120–130° C./25 mm. Hg using ethyltoluene, B.P. 162° C., as a heat transfer medium. A residue of 116 g. was obtained. The flash distillate, 1284 g., was fractionated through a three-foot column at 50 mm. Hg and yielded 467.0 g. of phenol, B.P. 99–108° C. (mostly 103° C.); 27.0 g. of intermediate (10 percent phenol, 90 percent o-t-butylphenol), B.P. 108–136°C.; 511.0 g. of o-t-butylphenol, B.P. 136–137° C.; 91.0 g. of crude p-t-butylphenol, B.P. 137–161° C.; and 46.7 g. of crude (70 percent) 2,6-di-t-butylphenol. The above results correspond to a 36.6 percent conversion to o-t-butylphenol and an ultimate yield of 69 percent.

EXAMPLE VII t-Butylation of phenol

A one-gallon autoclave was charged with phenol, 1100 g. (11.46 moles), and recovered titanium catecholate, 116 g., from the experiment of Example VI. The mixture was heated to 160° C. and alkylated with isobutylene, 576 g. (10.3 moles), at 130 p.s.i.g. N₂, over a nine hour period. The mixture was heated for one hour at 160° C. after isobutylene addition was stopped. The mixture was cooled and discharged. The discharged material was flash distilled at 162° C./5 mm. Hg. The flash distillate weighed 1558 g. and a residue of 110 g. was obtained. The flash distillate was fractionally distilled through a three-foot packed column at 50 mm. Hg. The products obtained were 337 g. of phenol, B.P. 102–109° C.; 89.4 g. of intermediate I (19 percent phenol); 81 percent o-t-butylphenol), B.P. 104–136° C.; 664.0 g. of o-t-butylphenol, B.P. 136–137° C. and 29.2 g. of intermediate II (66 percent o-t-butylphenol; 25 percent p-t-butylphenol and 9 percent di-t-butylphenol), B.P. 137–151° C. The above results correspond to a 43.9 percent conversion to o-t-butylphenol and a 64.7 percent ultimate yield.

EXAMPLE VIII t-Butylation of phenol

A mixture of phenol, 848 g. (9.02 moles) and recovered titanium catecholate, 92 g., from the experiment of Example VII, was charged into a one-gallon autoclave. The mixture was heated to 140–145° C., and alkylated with isobutylene at 200 p.s.i.g. (N₂+180 butylene) over an eight hour period. The mixture was heated at 140° C. for one hour after the addition of isobutylene was stopped. The mixture was cooled and discharged. The weight of discharged material was 1536 g., corresponding to a net weight gain of 596 g. (10.6 moles of isobutylene). Chromatographic analysis showed 25.5 percent phenol, 46.2 percent o-t-butylphenol, 1.2 percent p-t-butylphenol, 22.7 percent di-t-butylphenol, and 4.3 percent tri-t-butylphenol. These results correspond to a 43.5 percent conversion to o-t-butylphenol and a 70.7 percent ultimate yield.

EXAMPLE IX t-Butylation of o-cresol

A suspension of o-cresol, 1079 g. (10 moles) and titanium catecholate, 67 g., was charged into a one-gallon autoclave. The mixture was butylated with isobutylene at 155° C./200 p.s.i.g. N₂ over a 0.5 hour period. The autoclave was vented and the mixture was heated at 155° C. for an additional 0.5 hour. The reaction mixture was cooled and discharged, 1513 g. A sample subjected to chromatographic analysis showed 56 percent o-cresol, 33.9 percent 6-t-butyl-2-methylphenol, 4.6 percent 4-t-butyl-o-cresol and 5.6 percent 4,6-di-t-butyl-2-methylphenol.

The reaction mixture was flash distilled at 50 mm. Hg with the final devolatilization of the residue being conducted at 162° C./5 mm. Hg (reflux temperature of ethyltoluene). The flash distillate weighed 1238 g. and the residue weighed 108 g. for a total of 1346 g. The flash distillate was fractionated through a three-foot column at 50 mm. Hg and gave 674 g. of o-cresol, B.P. 108–109° C.; 104 g. of intermediate I (containing 63.6 percent o-cresol and 36.6 percent 6-t-butyl-2-methylphenol), B.P. 109–139° C.; 420.0 g. of 6-t-butyl-2-methylphenol, B.P. 139–141.5° C.; 2.8 g. of hold-up and 109.0 g. of residue (1.9 percent 6-t-butyl-2-methylphenol, 55.9 percent 4-t-butyl-2-methylphenol and 42.9 percent 4,6-di-t-butyl-2-methylphenol). The ultimate yield of 6-t-butyl-2-methylphenol was 70 percent.

EXAMPLE X

Isopropylation of m-cresol

A one-gallon autoclave was charged with m-cresol, 1151 g. (10.66 mole) and titanium catecholate, 67 g. The mixture was heated to 250° C. and alkylated with propylene at 200 p.s.i.g. (N₂+propylene) using a gas inlet tube. The autoclave was partially vented every two hours to prevent the build up of nitrogen and propane. The addition of propylene was continued for eight hours. The reaction mixture was heated at 250° C. for an additional four hours. The reaction mixture was cooled and discharged.

The total weight of recovered material was 1279 g. (material loss suffered during venting operation). The mixture was flash distilled at 162° C./5 mm. Hg. The flash distillate weighed 1088 g. and the residue weighed 126 g. The flash distillate was fractionated through a three-foot column at 50 mm. Hg and gave 589 g. of m-cresol, B.P. 117–120° C.; 45.1 g. of intermediate I (26 percent m-cresol, 63 percent thymol and 2-isomer and 11 percent unknowns); 347.0 g. of crude thymol (1.0 percent m-cresol, 7 percent unknowns, and 92 percent thymol and 2-isomer), B.P. 137–148° C. The ultimate yield was only 51 percent, due to loss of material during discharge of the autoclave. Based on cresols accounted for, the ultimate yield should be about 72–82 percent.

I claim:

1. In the process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature and a pressure up to 3000 p.s.i.g., the improvement comprising conducting the reaction in the presence of a catalytic amount of titanium catecholate.

2. In a process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature of 50–400° C. and a pressure up to 3000 p.s.i.g., the improvement comprising conducting the reaction in the presence of 0.05–15 mole percent, based on the number of moles of hydroxyaromatic hydrocarbon being subjected to alkylation, of titanium catecholate.

3. A process for the selective catalytic ortho-alkylation of phenol, comprising reacting phenol with an olefin having up to 20 carbon atoms at a temperature of 125–300° C. and at a pressure up to 1200 p.s.i.g. in the presence of 0.3 to 10 mole percent, based on the number of moles of phenol, of titanium catecholate.

4. A process for the selective catalytic ortho-alkylation of cresol, comprising reacting cresol with an olefin having up to 20 carbon atoms at a temperature of 125–300° C. and at a pressure up to 1200 p.s.i.g. in the presence of 0.3 to 10 mole percent, based on the number of moles of phenol, of titanium catecholate.

5. A process for the selective ortho-styrenation of phenol, comprising reacting phenol with up to 2.5 moles of styrene per mole of phenol at a temperature of 125–300° C. at atmospheric pressure in the presence of 0.3 to 10 mole percent based on the number of moles of phenol, of titanium catecholate.

6. A process for the selective ortho-t-butylation of phenol, comprising reacting phenol with up to 2.5 moles of isobutylene per mole of phenol at a temperature of 125–300° C. at atmospheric pressure in the presence of 0.3 to 10 mole percent, based on the number of moles of phenol, of titanium catecholate.

7. A process for the selective ortho-isopropylation of m-cresol, comprising reacting m-cresol with up to 2.5 moles of propylene per mole of m-cresol at a temperature of 125–300° C. at atmospheric pressure in the presence of 0.3 to 10 mole percent, based on the number of moles of m-cresol, of titanium catecholate.

References Cited by the Examiner

UNITED STATES PATENTS 2,831,898  4/1958  Ecke et al. _____ 260—619 X

LEON ZITVER, *Primary Examiner.*

D. M. HELFER, *Assistant Examiner.*

UNITED STATES PATENT OFFICE
CERTIFICATE OF CORRECTION

Patent No. 3,267,155                      August 16, 1966

Gerd Leston

It is hereby certified that error appears in the above numbered patent requiring correction and that the said Letters Patent should read as corrected below.

Column 7, line 16, for "the", first occurrence, read -- a --; column 8, line 9, for "phenol" read -- cresol --.

Signed and sealed this 1st day of August 1967.

(SEAL)
Attest:

Edward M. Fletcher, Jr.                      EDWARD J. BRENNER

Attesting Officer                           Commissioner of Patents